US011126749B2

(12) United States Patent
Newman

(10) Patent No.: US 11,126,749 B2
(45) Date of Patent: *Sep. 21, 2021

(54) APPARATUS AND METHOD FOR SECURING WEB APPLICATION SERVER SOURCE CODE

(71) Applicant: Newman Infinite, Inc., Valley Village, CA (US)

(72) Inventor: Matthew Allan Newman, Los Angeles, CA (US)

(73) Assignee: Newman Infinite, Inc., Valley Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,891

(22) Filed: Jun. 20, 2019

(65) Prior Publication Data

US 2019/0303601 A1 Oct. 3, 2019

Related U.S. Application Data

(63) Continuation of application No. 14/348,517, filed as application No. PCT/US2012/058349 on Oct. 1, 2012, now Pat. No. 10,380,382.

(Continued)

(51) Int. Cl.
*G06F 21/62* (2013.01)
*G06F 11/36* (2006.01)
(Continued)

(52) U.S. Cl.
CPC ........ *G06F 21/629* (2013.01); *G06F 11/3664* (2013.01); *G06F 21/52* (2013.01); *G06F 21/563* (2013.01)

(58) Field of Classification Search
CPC ...... G06F 21/629; G06F 21/52; G06F 21/563; G06F 11/3664; G06F 21/56; G06F 21/62
See application file for complete search history.

(56) References Cited

U.S. PATENT DOCUMENTS 5,958,049 A * 9/1999 Mealey ............... G06F 11/3664
    713/1
6,061,518 A * 5/2000 Hoffman ............... G06F 11/362
    714/38.1

(Continued)

OTHER PUBLICATIONS

USPTO Non-final action, Notice of References Cited, U.S. Appl. No. 14/348,517, PTO-892, dated Apr. 5, 2016.

(Continued)

*Primary Examiner* — Matthew Smithers
(74) *Attorney, Agent, or Firm* — Buchalter, APC; Sean Casey

(57) ABSTRACT

Systems, related methods and other means for providing the securing of JavaScript and source code are provided herein. The system and methods may be configured to poll a client device and/or to otherwise determine whether a debugging console is active on a client device and deny access to the JavaScript and source code if the debugging console is active. Additionally or alternatively, the system and methods may receive a request to access the JavaScript and source code form a client device, and may determine whether the request is from a trusted referrer. When the request is from an untrusted referrer, the system and method can deny access to the JavaScript and source code. When the request is from a trusted referrer, the system and method can grant access to the JavaScript and source code.

25 Claims, 5 Drawing Sheets

Related U.S. Application Data

(60) Provisional application No. 61/541,481, filed on Sep. 30, 2011.

(51) Int. Cl.
  *G06F 21/52* (2013.01)
  *G06F 21/56* (2013.01)

(56) References Cited

U.S. PATENT DOCUMENTS

| | | | |
|---|---|---|---|
| 7,512,986 B2 | 3/2009 | Shen-Orr et al. | |
| 8,201,149 B1* | 6/2012 | Gumtow | G06F 11/3664 |
| | | | 717/124 |
| 8,245,200 B2* | 8/2012 | Baierl | G06F 11/3636 |
| | | | 717/130 |
| 10,380,382 B2* | 8/2019 | Newman | G06F 21/52 |
| 2005/0033596 A1 | 2/2005 | Tummolo | |
| 2005/0268174 A1* | 12/2005 | Kumagai | G06F 21/79 |
| | | | 714/38.1 |
| 2007/0234430 A1* | 10/2007 | Goldsmid | G06F 21/121 |
| | | | 726/26 |
| 2010/0325705 A1 | 12/2010 | Iverson et al. | |
| 2012/0100246 A1 | 4/2012 | Bates | |
| 2012/0102465 A1* | 4/2012 | Bates | G06F 11/362 |
| | | | 717/125 |
| 2012/0246487 A1* | 9/2012 | Gu | G06F 21/51 |
| | | | 713/190 |
| 2013/0060905 A1* | 3/2013 | Mickens | H04L 67/025 |
| | | | 709/219 |

OTHER PUBLICATIONS

PCT International Search Report of the International Searching Authority for application PCT/US2012/058349, dated Dec. 6, 2012.
Phung, et al., Lightweight Self-Protecting Javascript, Mar. 2009, ACM, pp. 47-60.

* cited by examiner

FIG. 4

```
○○○   Source of  http://www.example.com/directory/index.html

<html>
<head>
    <meta http-equiv="Content-Type" content="text/html; charset=UTF-8">
    <meta http-equiv="Content-Style-Type" content="text/css">
    <meta name="viewport" content="width=1024,initial-scale = 1.0, user-scalable = no" />
    <meta name="apple-mobile-web-app-capable" content="yes">
    <meta name="apple-mobile-web-app-status-bar-style" content="black">

<title>yGGLE Grow - Version: 1.0 RC 9 - 120620</title>
    <link rel="shortcut icon" href="http://www.example.com/directory/favicon.ico"/>
    <link type="text/css" rel="stylesheet" href="http://www.example.com/directory/index.css"/>

<script type="text/javascript" src="http://www.example.com/directory/js"></script>
    <link type="text/css" rel="stylesheet" href="css-doc.jsp"/>
    <script type="text/javascript" src="javascript-doc.jsp"></script>

</head>
<body>

Page 1
```

APPARATUS AND METHOD FOR SECURING WEB APPLICATION SERVER SOURCE CODE

CROSS-REFERENCE TO RELATED APPLICATION

This application is a continuation application that claims the benefit of and priority to U.S. patent application Ser. No. 14/348,517 filed Mar. 28, 2014, which claims priority to and the benefit of Patent Cooperation Treaty application PCT/US12/58349 filed Oct. 1, 2012, which claims priority to U.S. Provisional Patent Application No. 61/541,481, filed Sep. 30, 2011, all of which are incorporated herein in their entirety as thought fully set forth herein.

FIELD

Embodiments of the invention relate generally to securing JavaScript and source code of a website.

BACKGROUND

As a scripting language primarily parsed on the client-side as an implementation within most web browsers, JavaScript is an example of a dynamic scripting language for clients of a website or web service. Widely acknowledged as a stable, accessible and largely universal scripting language with a range of formatting options, JavaScript is utilized in interactive web applications ranging from gaming and social networking to enterprise solutions. Areas for securing JavaScript and source code have been identified. Through applied effort, ingenuity, and innovation, solutions to improve such systems have been realized and are described in connection with embodiments of the present invention.

BRIEF SUMMARY

Systems, methods, computer readable program code stored on non-transitory storage media and other means are provided to, in general, improve security of JavaScripts, source code, and/or other information that may be accessed remotely via a network. More specifically, embodiments provided herein may securing JavaScript (e.g., JavaScript source code, portions of source code, and/or a service provided by the JavaScript). The method may include: determining (e.g., with one or more networked processors) whether a debugging console is active on a client device; denying access to the JavaScript if the debugging console is active on the client device; receiving a request to access the JavaScript from a client device; determining whether the request is received via a trusted referrer; and denying access to the JavaScript if the request is not received from a trusted referrer.

In some embodiments, determining whether the debugging console is active on the client device may include polling the client device. Polling the client device may be performed intermittently and/or at defined polling intervals.

In some embodiments, the request to access the JavaScript may be received via a network protocol (e.g., Hypertext Transfer Protocol (HTTP), Hypertext Transfer Protocol Secure (HTTPS), SPDY, Transmission Control Protocol and/or Internet protocol (TCP/IP), etc.). The request may include a referrer field (e.g., the "referer" field for HTTP). Determining whether the request is from a trusted referrer may include comparing data in the referrer field with a list of one or more trusted referrers. As such, the method may further include accessing the list of one or more trusted referrers in one or more databases.

In some embodiments, denying access to the JavaScript may include sending an error message to the client device. Alternatively and/or additionally, denying access to the JavaScript may include denying access to a service provided by the JavaScript and/or the source code of the JavaScript.

In some embodiments, the method may further include storing a debugging console status that denies access to the service provided by the JavaScript when a debugging device is detected.

In some embodiments, the JavaScript may be provided by a server separate from networked processor that secures the JavaScript.

Some embodiments may include an apparatus and/or system configured to implement the methods and/or other functionality discussed herein. In other words, the apparatus may include one or more processors and/or other machine components configured to implement the functionality discussed herein based on instructions and/or other data stored in memory and/or other non-transitory computer readable media.

These characteristics as well as additional features, functions, and details of the present invention are described below. Similarly, corresponding and additional embodiments are also described below.

BRIEF DESCRIPTION OF THE DRAWINGS

Figure 1:
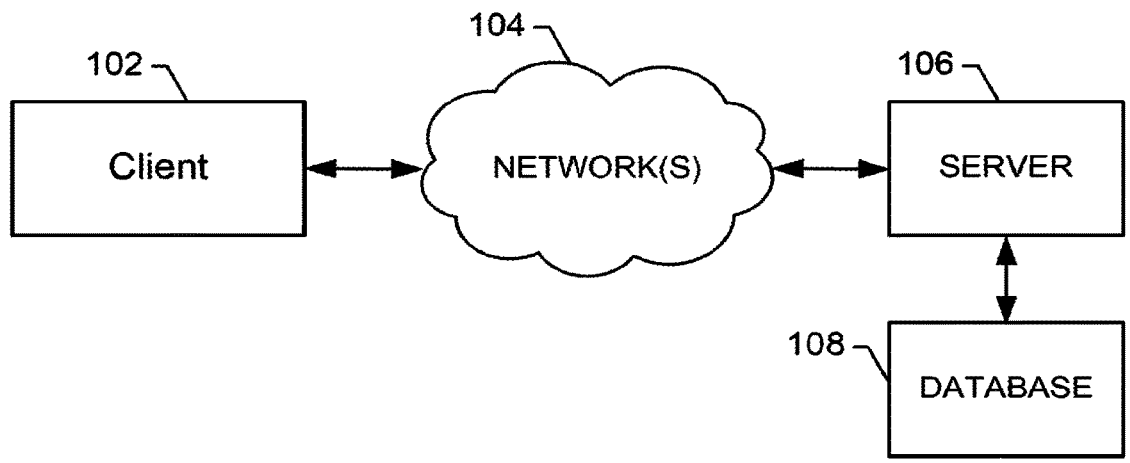
Figure 2:
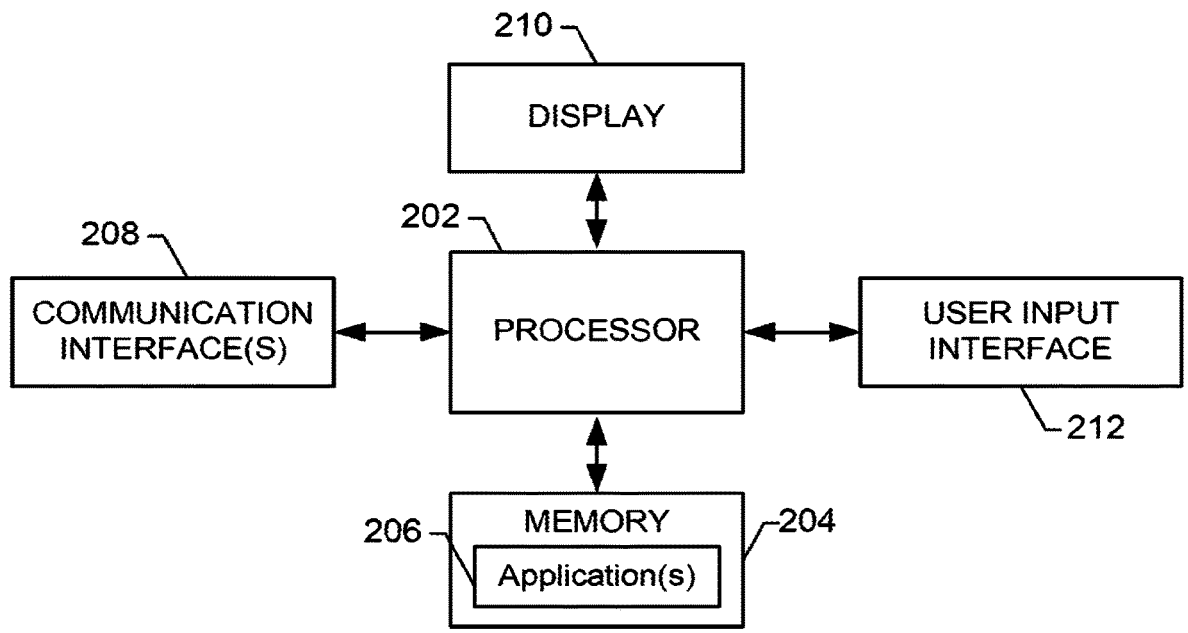
Figure 3A:
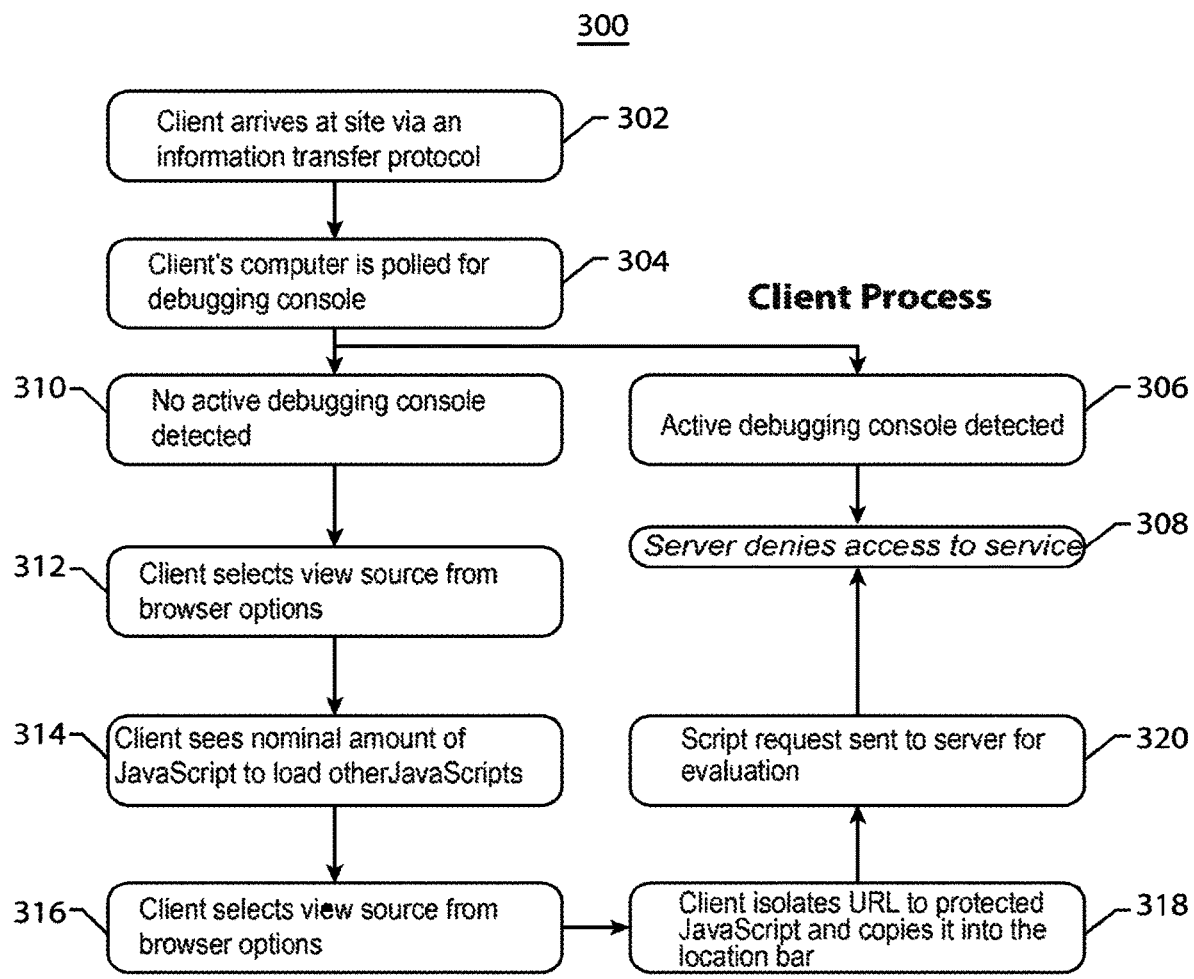
Figure 3B:
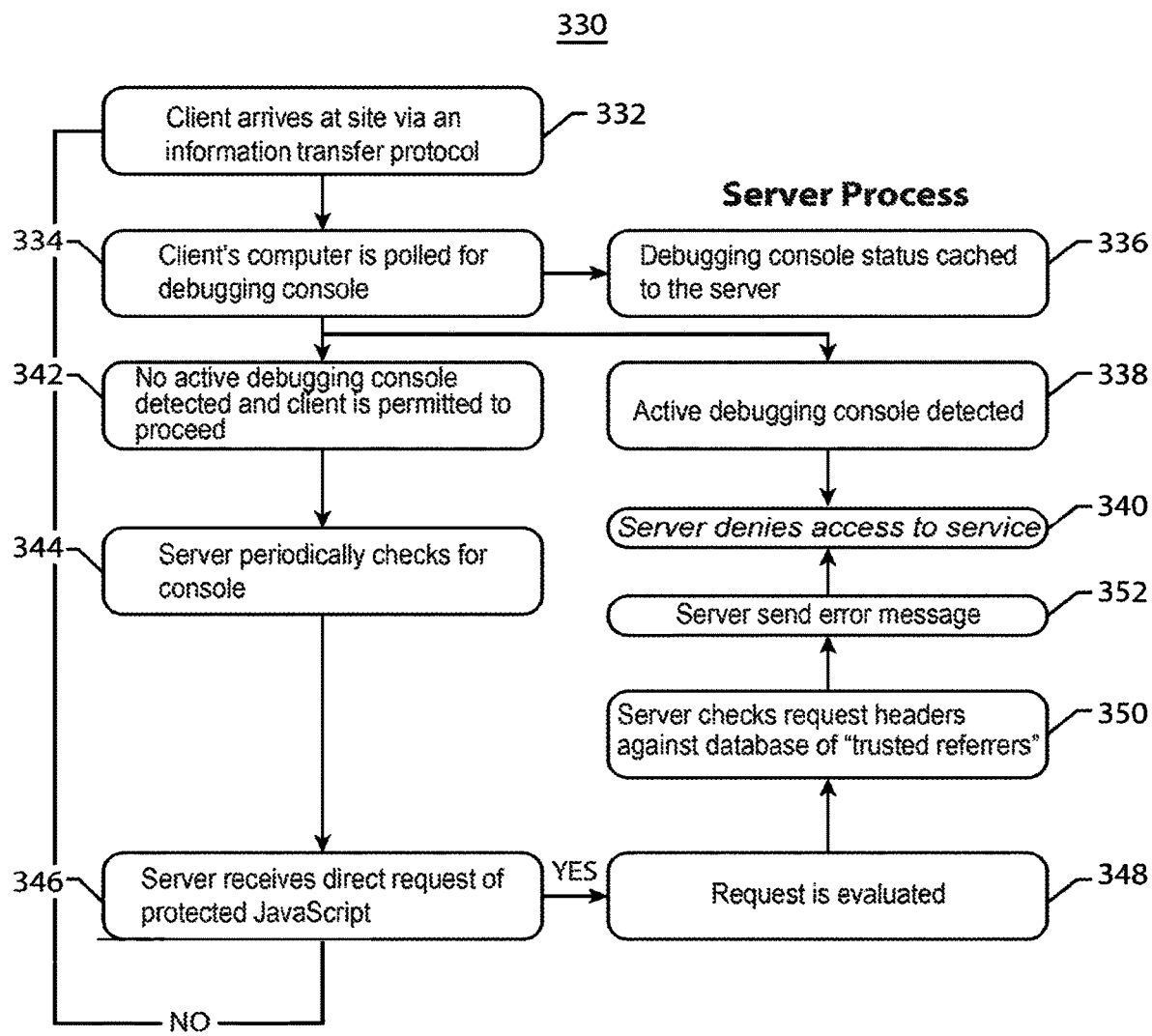
Figure 5:

Having thus described embodiments of the invention in general terms, reference will now be made to the accompanying drawings, which are not necessarily drawn to scale, and wherein:

FIG. 1 is a schematic block diagram of a system, configured in accordance with some embodiments;

FIG. 2 is a schematic block diagram of an apparatus, configured in accordance with some embodiments;

FIGS. 3A and 3B show flow charts of example methods, performed in accordance with some embodiments;

FIG. 4 shows an example view source display, in accordance with some embodiments; and FIG. 5 shows an example error page, in accordance with some embodiments.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Embodiments discussed herein may be configured to enable a website provider (e.g., a merchant or other online service provider) to secure its JavaScript, among other types of code and/or currently publically available information, from being viewed by third parties, including competitors, hackers, reverse-engineers, and/or any other unauthorized party and/or machine(s).

Soon after the introduction of the visual internet, browser development groups realized the need for a simplified client-side scripting language to extend the limitations of the SGML (standard generalized markup language) derived HTML (HyperText markup language), which gave rise to the development of scripting languages, including JavaScript, which allowed direct access to the document object model (DOM), a set of standards that define elements within a webpage as programmable objects.

To promote the growth of web technologies, the Internet's earliest architects permitted client-side viewing and sharing of source code, with all reliant and downloaded scripts viewable to the user of a client machine. Consequently, the use of any proprietary algorithms that may be inserted into JavaScripts, were by default, placed into the public domain. In this regard, some embodiments provide intellectual property protection techniques that conceal proprietary JavaScript, e.g., within a Java wrapper.

Since JavaScript gave programmers the ability to manipulate and extend the DOM, which became defined as an Internet standard, JavaScript's function as a prototypal object oriented scripting language has opened the door for developers in programming frameworks, such as Prototype and jQuery, that simplify HTML document traversing, event handling, animating and asynchronous interactions. But along with all of JavaScript's rapid deployment advantages, comes the challenge of intellectual property protection for a protocol that downloads and caches data in the client's web browser.

Currently, intellectual property protection measures for JavaScripts (such as those that prevent the public's access to the JavaScripts) are limited to obfuscation measures intended only to impede or discourage hackers, and minification programs designed primarily as code optimization tools, with intellectual property protection a consequential secondary effect. While these machine-implemented methods are sufficient for dissuading the casual hacker or other unauthorized user, they can also prove problematic in the debugging process, and are a completely ineffective defensive against a minimally skilled and determined hacker motivated by the potential of a large financial return-on-investment for time invested in reverse engineering valuable code.

In the absence of a robust JavaScript intellectual property protection methodology, programmers have been forced to open source JavaScript code to instate an elementary and limited license. While open source libraries have been crucial for the general advancement of the Internet, the culture of openness that has evolved within the programming community runs counter to the value building process that is largely based on the protection and exploitation of a firm's intellectual property. From 1982 to 2002, it has been reported that intangible assets, including trademarks, trade names and other types of intellectual properties, grew from 40% of a firms' value to account for a full 75% of total valuation. For all of its efficiency, JavaScript has eviscerated the concept of intellectual property as a proprietary asset protected by law, effectively denying JavaScript developers the potential gains associated with the monetization of creative value.

Barriers hampering development efforts in protecting JavaScript and other intangible intellectual properties include bandwidth and computational overhead limitations, and an inability to efficiently deploy a functional content delivery network architecture capable of securing data delivery to the client.

Some embodiments discussed herein, such as that sometimes referred to as "Hide JS," can provide simple and stable intellectual property protections using machine-implemented methods that cause the concealing of proprietary JavaScript within a Java wrapper, among other things. Some embodiments cause relatively minor network architectural changes and can be implemented by most network engineers by instantiating Hide JS on a targeted server.

FIG. 1 illustrates a system 100 that may benefit from exemplary embodiments of the present invention ("example," "exemplary" and like terms as used herein refer to "serving as an example, instance or illustration"). System 100 may include one or more clients 102, one or more servers 106, and one or more databases 108. In some embodiments, client 102 and/or server 106 may comprise, include or be embodied in one or more portable or fixed electronic devices, such as one or more of a portable media player, smartphone, portable digital assistant (PDA), tablet computer, laptop computer, desktop computer, server computer or the like. Client 102 may be configured to function primarily as a consumer device with which a person uses to access and/or build websites, among other things. Server 106 may be configured to function primarily as a machine that serves websites and/or other information to client devices, such as client 102.

Client 102 and server 106 may be configured to directly and/or indirectly communicate with one another in any of a number of different manners including, for example, any of a number of wireline or wireless communication or networking techniques. Examples of such techniques include, without limitation, Universal Serial Bus (USB), radio frequency (RF), Bluetooth (BT), infrared (IrDA), any of a number of different cellular (wireless) communication techniques such as any of a number of 2G, 2.5G, 3G or 4G communication techniques, local area network (LAN), wireless LAN (WLAN) techniques or the like. In some embodiments, client 102 and server 106 may be coupled to and configured to communicate across one or more networks 104. Network 104 may include any of a number of different combinations of one or more different types of networks, including data and/or voice networks. For example, network 104 may include one or more data networks, such as a LAN, a metropolitan area network (MAN), and/or a wide area network (WAN) (e.g., Internet), and include one or more voice networks, such as a public-switched telephone network (PSTN). Although not shown to avoid unnecessarily complicating FIG. 1, network 104 may include one or more apparatuses such as one or more routers, switches or the like for relaying data, information or the like between the client and server.

One or more databases 108 may be configured to communicate with the one or more servers 106. In that sense, one or more servers 106 may include database management systems that control the creation, maintenance and use of databases 108. As will be discussed in greater detail below, webpage content and/or data for securing JavaScript may be stored in databases 108 and accessed in accordance with the techniques described herein.

Reference is now made to FIG. 2, which illustrates a block diagram of an example apparatus 200 that may be configured to operate as or otherwise perform one or more functions of client 102 and/or server 106. Although shown in FIG. 1 as separate devices, in some embodiments, apparatus 200 may support both a client and server, logically separated but co-located within apparatus 200. Apparatus 200 may be configured to provide various means, such as being configured to perform one or more functions described herein (e.g., methods 300 and 330 shown in FIGS. 3A and 3B). It should be understood, however, that apparatus 200 is only an example, and that other structures may be used to perform one or more like functions.

As shown in FIG. 2, apparatus 200 may include processor 202 connected to memory 204. Memory 204 may include volatile and/or non-volatile memory, and typically stores content, data or the like. In this regard, the memory may store one or more applications 206, modules, instructions, computer-readable program code portions, or the like that may be executed by processor 202 to perform the one or more functions described herein. One example of such applications is provided for securing JavaScript applications and, without limitation, is referred to herein as "Hide JS." Examples of other applications include one or more web browsers, productivity applications, gaming applications, utilities or the like.

Memory 204 may also be configured to store content transmitted from, and/or received by, apparatus 200. As described herein, the application(s) may each comprise modules operated by apparatus 200. As referred to herein, a "module" can be implemented by software, firmware, hardware or any combination thereof.

In some embodiments, processor 202 may also be connected to at least one interface or other means for displaying, transmitting and/or receiving data, content or the like, such as in accordance with USB, RF, BT, IrDA, WLAN, LAN, MAN, WAN (e.g., Internet), PSTN techniques or the like. In this regard, the interface(s) may include at least one communication interface 208 or other means for transmitting and/or receiving data, content or the like. In addition to communication interface 208, the interface(s) may also include at least one user interface that may include one or more earphones and/or speakers, a display 210 (which may include any suitable display screen configured to present visual information to a user), and/or a user input interface 212. User input interface 212, in turn, may include one or more of a number of devices allowing apparatus 200 to receive data from a user, such as a microphone, a keypad, a touch-sensitive surface (integral or separate from the display), a joystick, a mouse, or other input device.

As indicated above, apparatus 200 may include applications (e.g., applications 206) for execution by processor 202 to perform steps associated with operation of the apparatus in accordance with some embodiments. One example of such application, namely Hide JS, is provided for securing JavaScript.

According to some embodiments, all or a portion of client 102 and/or server 106 generally operate under control of a computer program. The computer program for performing the methods of exemplary embodiments may include one or more computer-readable program code portions, such as a series of computer instructions, embodied or otherwise stored in a computer-readable storage medium, such as the non-volatile storage medium.

For example, FIGS. 3A and 3B show flow charts of methods 300 and 330, respectively, for securing Javascript, performed in accordance with some embodiments. Each block or step of the flow chart shown by FIGS. 3A and 3B, and/or combinations of blocks in the flow chart, represent functionality that may be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the functions specified in the block(s) or step(s) of the flowcharts. These computer program instructions may also be stored in a computer-readable memory (e.g., memory 204) that may direct a computer or other programmable apparatus to function in a particular manner, such that the instructions stored in the computer-readable memory produce an article of manufacture including instruction means which implement the function specified in the block(s) or step(s) of the flow chart. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flow chart.

Accordingly, blocks or steps of the flow chart support combinations of means for performing the specified functions, combinations of steps for performing the specified functions and program instruction means for performing the specified functions. It will also be understood that one or more blocks or steps of the flow chart, and combinations of blocks or steps in the flow chart, may be implemented by special purpose hardware-based computer systems which perform the specified functions or steps, or combinations of special purpose hardware and computer instructions.

Method 300 of FIG. 3A may be a client-end operation performed by one or more client devices (e.g., client 102). At 302, a client device may arrive virtually at a website and/or other network destination via an information protocol. For example, client 102 may run a web browser that allows the client device to access information stored at the website. Arriving at the website, as referred to herein, comprises the client device requesting the website be served to the client device.

At 304, the client device is polled for a debugging console. A debugging console and/or other type of debugging module may allow the client to circumvent relevant header evaluation (as discussed in further detail below) and receive all documents (e.g., JavaScript files, html files, media files, etc.). For example, when a client arrives at an online service hosted by a server employing HideJS via an information transfer protocol, the server may poll the client machine for a debugging console and caches the status in session data that resides either volatilely or persistently within the service architecture.

In response to determining an active state of a debugging console is discovered, the client may be redirected to 306, and service may be disallowed at 308. For example, when service is disallowed, the client may be prevented from circumventing aspects of Hide JS privacy protection methods and a display, such as that discussed further in connection with FIG. 5, can be presented to the user of the client device.

In response to determining no debugging console has been detected, method 300 can proceed to 310, and the client device may be allowed to proceed to the service. For example, the client may select to view source option 312 from a menu of browser options provided by "right-clicking" (e.g., selecting the right button of a mouse) on a webpage displayed by a web browser running on the client device.

At 314, the client device can be provided and allow its user to see various amounts of JavaScript to load other JavaScripts. For example, a nominal amount of JavaScript might be served to the client device 102.

In some embodiments, intermittent and/or timed polling can be conducted throughout the session and may prevent activation of a debugging console following the initial poll. For example, after granting a client device access and serving JavaScripts at 314, a timer may begin running. After a predetermined period of time has passed, and a second request to access JavaScripts and/or other indication is received (such as the client still being served the JavaScripts) at 316 and the client tries to access at 318 the protected JavaScript (e.g., by copying and pasting into a web browser's location bar), method 300 can proceed to 320 where the script request is sent to a server for evaluation and, if applicable, the server can deny access to the service at 308.

FIG. 4 shows an example view source display 400 of a web page 410 (e.g., a web page encoded as an html document) that may be shown on the client responsive to the user selecting the view source option after navigating to web page 410. View source display 400 may include the web page 410's hypertext. Furthermore, nominal amounts of JavaScript that direct the client's web browser to request protected JavaScript (e.g., for lazy loading and/or through a "get" function) may be exposed in text format, as shown at URL 402.

To generate the request for the protected JavaScript, the user may enter URL 402 into the location bar of the client (e.g., a web browser). However, it is appreciated that other techniques may be used to request the protected JavaScript (e.g., copy and paste, scripting, browser extensions, etc.). Additionally and/or alternatively, the request for the protected JavaScript may be generated when the user accesses web page 410, such as by entering URL 404 into location bar 412.

In some embodiments different scripts can be treated with different level of security. For example, a low level security script can be presented at 314, but a high level security script can be blocked at 320 and 308.

Method 330 of FIG. 3B is an example of a back-end functionality that may be performed by one or more servers (e.g., server 106). At 332, one or more servers (e.g., server 106) may be configured to determine that a client device has arrived at a site, which the server may make publically available on the Internet, via in information transfer protocol. For example, a client device (e.g., client 102) may have sent a request to the website for data at 302 (e.g., when a user of the client device enters an appropriate uniform resource locator (URL) into the address bar of a web browser, by selecting a URL link, launching the web browser, or by any other technique) that is received by the server. The website may include a service hosted by the server via the information transfer protocol.

The Hypertext Transfer Protocol (HTTP), the standard set by the Internet Engineering Task Force (IETF) as documented in RFC 2616, is an example of an information transfer protocol that enables communication between the client and the server. To comply with HTTP, all transactions (e.g., between the client and server) must send and receive a predefined set of request/response header information in the form of invisible fields that are parsed by both the client and server. Using the header information, the server is able to send specific rules to the client that can help govern the final delivery of content requested from the server.

At 334, the one or more servers may poll the client, or otherwise receive data from the client, for a debugging console status. As noted above, a debugging console, or other debugging module, may allow the client device to circumvent at least some relevant header evaluations (as discussed in further detail below) and/or receive at least some information from the server (e.g., JavaScript files, html files, media files, etc.). In some embodiments, a script embedded in JavaScript may be initially sent to the client. The script may poll the browser for activated debugging devices and/or module, prior to loading the remaining content of the website (e.g., protected Javascript). Using an XMLHttpRequest, for example, the script may then post the status back to the server.

At 336, the one or more servers may be configured to store the debugging console status (e.g., whether the client has an active debugging console) in one or more databases (such as database 108), which may be the same and/or different databases as where the website's content is stored. As another example, the status may be stored in a cache as server-side session data that resides either volatilely and/or persistently within service architecture. As such, the status may serve as a credential that denies further web site access (e.g., access to a service provided by JavaScript and/or any other data associated with the web site) by the client when a debugging device is detected.

After determining an active debugging console has been detected at 338, the server(s) can be configured to deny access to the client device at 340. For example, the JavaScript sent to the client at 336 may be configured disable all subsequent JavaScript initializations (e.g., via lazy loading additional scripts as discussed below in greater detail) at 340. Additionally and/or alternatively, the client may be redirected (e.g., to a different website), service may be disallowed, and/or the client may be otherwise prevented from accessing the service, the website, and/or related data.

If an active debugging console is not detected, method 330 may proceed to 342, where the client may be allowed to proceed and/or otherwise access the service, associated JavaScript, and/or other website data.

At 344, the one or more servers may be configured to determine whether a request for protected JavaScript is requested from the client. As such, the one or more servers may be configured to receive a request for protected JaveScript. For example, when a website is loaded on a web browser, a user of the client may select a "view source" option in the web browser. As noted above, FIG. 4 shows an example view source display 400 of a web page 410 (e.g., a web page encoded as an html document) that may be shown on the client responsive to the user selecting the view source option after navigating to web page 410. If a request for protected JavaScript is received at 346, method 330 may proceed to 348.

At 348, the one or more servers may be configured to determine whether the request is received via a trusted referrer. As discussed above, the HTTP standard specifies that requests (e.g., the request for protected JavaScript received at 346) include header information in the form of fields. In that sense, a referrer field is present when a referring document (e.g., web page 410 of FIG. 4) makes an HTTP request for additional document(s) (e.g., protected JavaScript) within the HTML syntax (e.g., via URL 402 of FIG. 4). The referrer field may include the URL of the referring document (including directories, top-level domain, sub-domains, etc.). As such, URL 404 shown in FIG. 4 is an example of an example of data in the referrer field when the request for the protected JavaScript is generated via the user accessing web page 410. It is appreciated that "referrer field," as used to herein, may refer to the "referer field" that is in HTTP header information. In some embodiments, referrer field may refer to information within a network protocol that identifies a referring document and/or a lack of a referring document.

In the event of a directly requested file (e.g., when the protected JavaScript is not requested by the client via accessing web page 410), the absence of a referrer may result in a null referrer field. A similar result may occur if a document URL (e.g., URL 402) is placed directly into the location bar within the web browser.

In some embodiments, a wrapper may be used to evaluate the request and the response may be delegated according to developer specifications established prior to delivery of the protected JavaScript. For example, a JavaServer Page (JSP) may evaluate the request and respond with an appropriate text file. Since file extension is not part of the parameter requirements of the location string within "src" or "href" request, it may be possible to respond with a JSP document as a text document, satisfying the requirement for those standards. As such, view source display 400 may include references to URLs 406 and 408 as shown in FIG. 4.

When the web browser makes the requests for css-doc.jsp and javascriptdoc.jsp (e.g., when web page 410 is accessed by the client), the referrer field may include URL 404. URL 404 may be evaluated against a database (or one or more databases) of valid referrers, and if found valid (e.g., if URL 404 matches a valid referrer for the JavaScript), the requested protected JavaScript may be delegated and returned to the client.

In some embodiments, some or all of the referring documents within the website or service may be documented in the one or more databases of valid referrers. Document names may be stored in a database management system, such as a normalized data structure, or within a text document that is tokenized with commas, spaces, quotes, etc. allowing for the one or more servers to parse the list efficiently.

If the document is requested directly without a referring document, the one or more servers may evaluate the absence of a referrer, and may allow the developer to respond with an appropriate error message (e.g., via the returned JSP document and/or text document). For example, the error message may include an indication that the protected JavaScript cannot be accessed, as shown at 502 of web browser 500 in FIG. 5. The message may further include appropriate legal information regarding intellectual property protection. Additionally and/or alternatively, the access attempt may be logged.

It is appreciated that using the wrapper to send the error message may prevent the client from viewing protected JavaScript source code, data that may be used derive the source code, and/or data that may expose the functionality of the protected JavaScript. Additionally and/or alternatively, the wrapper may prevent the web browser from caching the protected JavaScript, thereby deny access at the time of the request and/or in the future. As such, method 330 may also assist with thwarting malicious hackers by providing a barrier to source code accessibility.

At 350, the server(s) can be configured to evaluate the request headers against a database of trusted referrers. Trusted referrers can be identified based on any suitable information, such as internet protocol addresses, user names and/or passwords, and/or any other suitable information that can be provided as what is referred to herein as "referrer text."

In response to determining the referrer text is null, fails to match a corresponding URL in the database trusted referrers and/or is otherwise determined to be unauthorized referrer text for the requested JavaScripts and source code, the one or more servers may be configured to respond by sending an error message at 352. Additionally and/or alternatively, the script source of the protected JavaScript is not sent to the client. The one or more servers may be further configured to deny access to the service provided by the protected Javascript and source code at 340. If the referrer text matches a corresponding URL in the database of trusted referrers, the server(s) may grant the client device access to the service (e.g., the protected JavaScript).

Returning to 346, if no request for protected JavaScript is received, method 330 may return to 334, where the one or more servers may poll the client for debugging console status. Intermittent or timed polling conducted throughout the session may prevent activation of a debugging console following the initial poll.

It may be possible for the client to circumvent portions of method 330 by activating the debugging console during the period of time between completion of content download and the polling interval, giving the debugging console a limited window of opportunity to locate and deactivate the polling scripts.

In some embodiments, to effectively inhibit deactivation of the polling scripts, the server may be capable of bubbling and/or pushing polling functionality (e.g., an application) to the web browser to prevent the client from bypassing this security measure by activating the debugging console after the initial check. For example, the application may be configured to send a message to the one or more servers upon detecting the activation of the debugging console.

While there may always be a subset of determined hackers capable of working around any security measure, embodiments discussed herein may provide basic intellectual property protection for proprietary code contained within source code such as JavaScripts and cascading style sheets (for the rare instances that it might be necessary to protect CSS IP.)

By concealing rather than obfuscating JavaScript source code, developers may be able to simplify the debugging development phase by maintaining integrity of the original code. In the interest of further hindering malicious hackers, or improving code optimization, methods 300 and/or 330 may be combined with obfuscation techniques and/or code minification techniques.

Methods 300 and/or 330 may provide an intuitive mechanism for protecting and exploiting intellectual property, giving developers the option of either open sourcing JavaScript intellectual property, exploiting it as part of a firm's value building process, and/or some combination thereof depending on, e.g., client device(s).

In some embodiments, method 330 may be performed on a server separate from an application server that provides the protected JavaScript and source code. Furthermore, method 330 may be performed by a multitude of web application servers because of the reliance on the HTTP protocol and the nature of the informational transaction that occurs within the request/response method. Consequently, PHP, Ruby (or any derivative), Visual Basic Script, .NET, Apache Tomcat, along with any comparable set of scripting/programming languages and their application servers, may be capable of delivering the content protection associated with Hide JS.

In some embodiments, JavaScripts and source code wrapped with method 330 may be instantiated through a compatibly structured content delivery network. While it is possible to perform method 330 on the same application server as a website or service, considerable performance overhead issues may be caused by an increase in requests via the HTTP protocol.

Placing the content delivery network on a separate set of servers with a unique sub-domain of a valid top-level domain, and then possibly on a subsequent sub-domain, may improve efficiency. By employing this technique, the increased level of requests may be delegated to a network specifically designed to handle the requests.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A web application server source code security system, comprising:
one or more servers coupled to a network and configured to communicate web application source code responsive to an access request from a client device;
the one or more servers configured to poll the client device to determine if the client device (a) has an active debugging console, and (b) is a trusted referrer; and
the one or more servers configured to enable client device access to the source code, responsive to the access request and determining at least one of the client device (i) debugging console is inactive and (ii) is a trusted referrer.

2. The system according to claim 1, wherein the one or more servers are configured to intermittently poll the client device.

3. The system according to claim 1, wherein the one or more servers are configured to poll the client device responsive to each access request.

4. The system according to claim 1, wherein the one or more servers are configured to receive a notification from the client device of debugging console activation.

5. The system according to claim 1, wherein the one or more servers are configured to poll the client device as the source code is accessed.

6. The system according to claim 1, wherein the one or more servers are configured to deny access to the source code responsive to determining the debugging console is active.

7. The system according to claim 6, responsive to denying access, the one or more servers are configured to communicate an error message to the client device.

8. The system according to claim 1, the one or more servers further configured to access a list of one or more trusted referrers in one or more databases to determine whether the client device is a trusted referrer.

9. The system according to claim 1, the one or more servers configured to (a) parse the access request and extract data from an HTTP field, and (b) compare the extracted data to a list of one or more trusted referrers in one or more databases to determine whether the client device is a trusted referrer.

10. The system according to claim 1, wherein the one or more servers are configured to store a debugging console status that is detected by the one or more servers to determine whether to grant or deny web application source code access to the client device.

11. A web application server source code security system, comprising:
one or more servers coupled to a network and configured to enable access to web application source code responsive to an access request from a client device;
the one or more servers configured to poll the client device to determine if the client device (a) has an active debugging console, and (b) is a trusted referrer, and to store a console status; and
the one or more servers configured to enable client device access to the source code, responsive to the access request and determining at least one of the client device (i) debugging console is inactive and (ii) is a trusted referrer.

12. A system according to claim 11, comprising:
at least one web application source code server in addition to the one or more servers, configured to communicate the web application source code responsive to the one or more servers enabling access.

13. The system according to claim 11, wherein the one or more servers are configured to intermittently poll the client device.

14. The system according to claim 11, wherein the one or more servers are configured to poll the client device responsive to each access request.

15. The system according to claim 11, wherein the one or more servers are configured to receive a notification from the client device of debugging console activation.

16. The system according to claim 11, wherein the one or more servers are configured to poll the client device as the source code is accessed.

17. The system according to claim 11, wherein the one or more servers are configured to deny access to the source code responsive to determining the debugging console is active.

18. The system according to claim 11, the one or more servers further configured to access a list of one or more trusted referrers in one or more databases to determine whether the client device is a trusted referrer.

19. A web application server source code security system, comprising:
one or more servers coupled to a network and configured to enable access to web application source code responsive to an access request from a client device;
the one or more servers configured to (a) parse the access request and extract data from an HTTP referred field, and (b) compare the extracted data to a list of one or more trusted referrers in one or more databases to determine whether the client device is a trusted referrer;

the one or more servers configured to poll the client device to determine if the client device (a) has an active debugging console, and (b) is a trusted referrer, and to store a console status; and the one or more servers configured to enable client device access to the source code, responsive to the access request and determining at least one of the client device (i) debugging console is inactive and (ii) is a trusted referrer.

20. A system according to claim 19, comprising:
at least one web application source code server in addition to the one or more servers, configured to communicate the web application source code responsive to the one or more servers enabling access.

21. The system according to claim 19, wherein the one or more servers are configured to intermittently poll the client device.

22. The system according to claim 19, wherein the one or more servers are configured to poll the client device responsive to each access request.

23. The system according to claim 19, wherein the one or more servers are configured to receive a notification from the client device of debugging console activation.

24. The system according to claim 19, wherein the one or more servers are configured to poll the client device as the source code is accessed.

25. The system according to claim 19, wherein the one or more servers are configured to deny access to the source code responsive to determining the debugging console is active.

* * * * *